(12) United States Patent
Scoones et al.

(10) Patent No.: US 6,215,286 B1
(45) Date of Patent: Apr. 10, 2001

(54) STEP-UP/STEP-DOWN SWITCHING REGULATOR OPERATION

(75) Inventors: Kevin Scoones, Munich; Franz Prexl, Niederding, both of (DE); Frank R. Fattori, Laurieston (GB)

(73) Assignee: Texas Instruments Deutschland GmbH, Freising (DE)

( * ) Notice: Subject to any disclaimer, the term of this patent is extended or adjusted under 35 U.S.C. 154(b) by 0 days.

(21) Appl. No.: 09/444,911

(22) Filed: Nov. 22, 1999

(30) Foreign Application Priority Data

Nov. 20, 1998 (DE) .............................. 198 53 626

(51) Int. Cl.⁷ ................................................ G05F 1/613
(52) U.S. Cl. ........................ 323/222; 323/225; 323/271; 323/284
(58) Field of Search ................................ 323/222, 225, 323/271, 282, 284

(56) References Cited

U.S. PATENT DOCUMENTS

| | | | |
|---|---|---|---|
| 4,347,474 | * | 8/1982 | Brooks et al. ........................ 323/282 |
| 4,736,151 | * | 4/1988 | Dishner ................................ 323/222 |
| 4,801,859 | * | 1/1989 | Dishner ................................ 323/222 |
| 5,196,995 | * | 3/1993 | Gulczynski .......................... 323/271 |
| 6,002,241 | * | 12/1999 | Jacobs et al. ........................ 323/225 |
| 6,037,755 | * | 3/2000 | Mao et al. ............................ 323/282 |

\* cited by examiner

*Primary Examiner*—Jeffrey Sterrett
(74) *Attorney, Agent, or Firm*—William B. Kempler; Frederick J. Telecky, Jr.

(57) ABSTRACT

The invention relates to switching regulators with at least one inductance and four controllable switches which can be controlled by a control circuit in such a way that the switching regulators may be operated separately in a step-up mode as well as in a step-down mode, whereby in each clock cycle of either of the modes only two switches each are actuated, which in comparison with previous similar switching regulators, where in each clock cycle four switching operations take place, results in current saving effects because of reduced switching losses and lower currents. These are achieved by an element which constantly monitors the duty cycle of one of the switches and, when in the step-down mode the duty cycle approaches 100%, causes a switch-over into the step-up mode, and when in the step-up mode the duty cycle of 0% is approached, causes the switch-over into the step-down mode. Furthermore, the invention relates to methods for operating switching regulators. The switching regulators according to the invention may, for example, find application in mobile telephones.

20 Claims, 3 Drawing Sheets

STEP-UP/STEP-DOWN SWITCHING REGULATOR OPERATION

Figure 1:
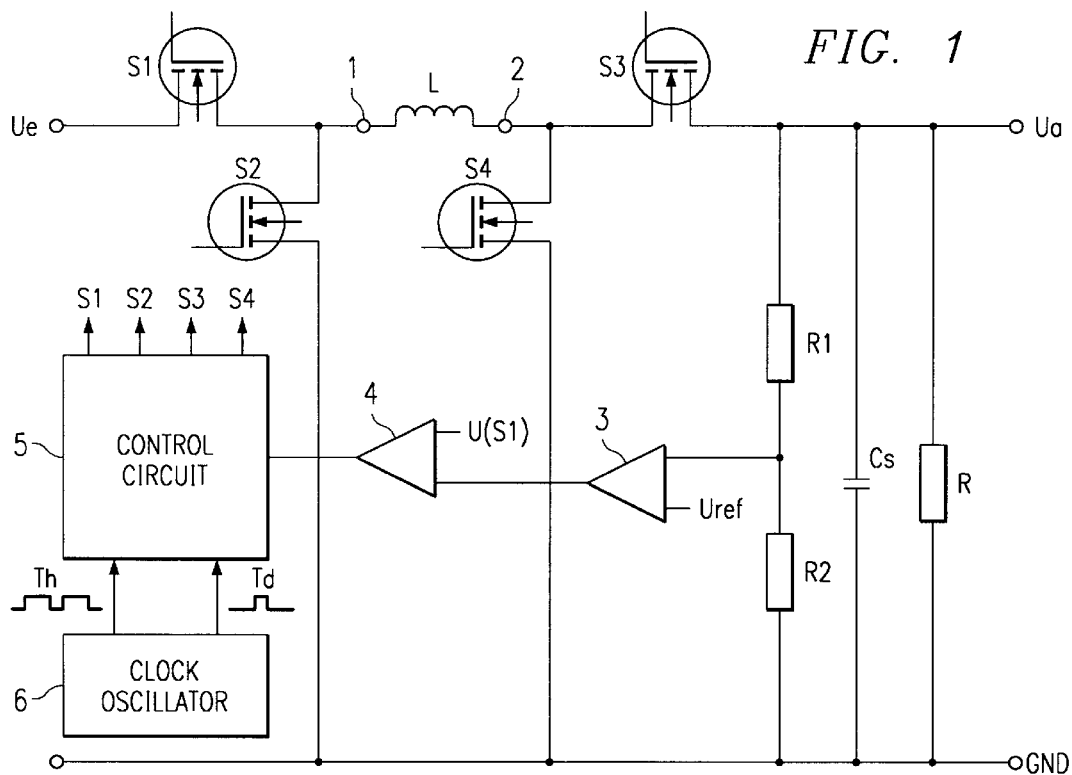

The invention relates to switching regulators, that is circuit arrangements for power supplies which step up or step down a DC voltage without using a transformer and which at their output supply a regulated voltage (so-called "regulated converters"). Furthermore, the invention relates to methods for operating such switching regulators.

Switching regulators can, for example, be used to obtain an optimum supply voltage for the circuit components in portable devices with a battery based power supply, such as a mobile telephone. If such devices are powered, for example, by a 3-cell Ni battery or by a Li+ battery, the battery can typically be discharged from a starting value of 5 volts to a voltage of 2.7 volts or even lower. The discharge curve of the battery will therefore, at a specific critical discharge point, go below the minimum supply voltage required by the circuit components of the device of, for example, 3.3 volts. In order to make optimum use of the battery capacity and, in particular, to use up the remaining capacity of the battery, switching regulators are used which supply the circuit components with a constant voltage slightly higher than the voltage required for the circuit components (of for example 3.4 V), so that at the beginning of the battery discharge curve, the battery voltage, which then will be in the range of for example 5 V, will be reduced by the switching regulator, and increased once the critical discharge point in the battery voltage is passed. But even before and after the critical discharge point, depending on the load situation, cases may present themselves when sometimes an increase and sometimes a reduction of the input voltage is required. By the use of the switching regulator it therefore becomes possible to increase the useful life of the battery and consequently the time of use of portable devices by a considerable amount. Since the battery voltage has to be both reduced and increased, step-up/step-down switching regulators are used in which the functions of step-up and step-down regulation are combined. Such a step-up/step-down switching regulator is, for example, described on pages 37 and 38 of the book "Schaltnetzteile" (Switching power supplies), second edition, by Udo Leonhard Thiel, and published by Franzis-Verlag, Poing in 1998, where it is represented in illustration 3.5.

The known switching regulator has, apart from the switching and regulating IC, an inductance, one of its terminals being connected to the input of the regulator via a first transistor switch and to ground via a first diode the cathode of which being connected to one of the terminals. The other terminal of the inductance is connected to the output of the switching regulator via a second diode whose anode is connected to the other terminal, and to ground via a second transistor switch. As is common practice with switching regulators, at the output of the regulator a capacitor is connected in parallel with the consumer, which temporarily takes over as a power supply when, because of the switching position, no current flows from the power source to the consumer. In the case of this regulator, the value of the output voltage is controlled by the ratio between the turn-on and off-times of the switches.

The switching regulator mentioned, however, suffers from the disadvantage that it comprises many components which cannot be integrated (diodes, inductance, capacitor), which represents a particular nuisance value when it is to be incorporated in a device where the smallest possible size is desirable for practical reasons, such as in the case of a mobile telephone where the dimensions of the device have a great influence on the purchase decision by the customer. It would certainly be possible to replace the diodes by integrated transistor circuits, but then it would be necessary in each clock cycle to switch four switches, since in the first part of the cycle the first switch and the second switch would have to be turned on, whereby the switches taking the place of the diodes would be turned off, and in the second part of the cycle the switches taking the place of the diodes would have to be turned on, whereby simultaneously the first switch and the second switch would have to be turned off. These frequent switching operations would cause high switching losses, which would reduce the efficiency of the switching regulator and therefore the time of effective use of the portable device.

The purpose of the present invention is to provide switching regulators which avoid the problems previously mentioned and which have a lower current consumption, thereby making them particularly suitable for applications in small portable devices, such as mobile telephones.

One solution according to the invention is realised in a switching regulator with an inductance of which one terminal is connected to the input of the regulator by a first switch and to ground by a second switch, and whose other terminal is connected to the output of the regulator by a third switch, and to ground by a fourth switch, whereby all switches are capable of being controlled and where the regulator can be operated in step-down mode, where the third switch is constantly turned on and the fourth switch is constantly turned off, and the first and the second switches are periodically and alternatively switched on and off, as a function of the duty cycle determined by the on-time of the first switch, and in step-up mode in which the first switch is constantly on and the second switch is constantly off, and where the third and the fourth switch are periodically and alternatively switched on and off as a function of the duty cycle determined by the on-time of the fourth switch, and a control circuit for the control of the switches, and a pulse duration modulator for the modification of the corresponding duty cycle for the correction of the regulation deviation as a function of the regulation deviation of the output voltage of the regulator, and comprising an element for monitoring the duty cycle and, when a duty cycle of 100% is approached in the step-down mode, switches to the step-up mode and when a duty cycle of 0% is approached in the step-up mode, switches to the step-down mode.

This switching regulator can also be realised in a particularly small size, since all the components of the switching regulator, with the exception of the inductance, can be made in the form of an integrated circuit.

Another solution to the problem according to the invention consists in a switching regulator with a first inductance where one of its terminals is connected to the input of the regulator and where the other terminal is connected to one end of a first switch, as well as to ground by a second switch, and a second inductance where one of its terminals is connected to the other end of the first switch by means of a third switch, as well as to ground via a fourth switch, and whose other terminal forms the output of the regulator, whereby a capacitor is connected across the connecting point between the first and the third switch and ground, where all switches can be controlled and where the regulator is operated in a step-down mode, where the first switch is constantly turned on and the second switch is constantly turned off, and the third and the fourth switches are periodically and alternatively switched on and off, as a function of the duty cycle determined by the on-time of the third switch, and in step-up mode in which the third switch is constantly on and the fourth switch is constantly off, and where the first and the second switches are periodically and alternatively switched on and off as a function of the duty cycle determined by the on-time of the second switch, and a control circuit for the control of the switches, and a pulse duration modulator for the modification of the corresponding duty cycle for the correction of the regulation deviation as a function of the regulation deviation of the output voltage of the regulator, and comprising an element for monitoring the duty cycle and, when a duty cycle of 100% is approached in the step-down mode, switches to the step-up mode and when a duty cycle of 0% is approached in the step-up mode, switches to the step-down mode.

Whilst it is not possible to miniaturise this switching regulator to such a degree as the switching regulator presented as the first solution to the problem according to the invention, it presents however an advantage over it when it comes to efficiency.

The problem is furthermore solved according to the invention by a method for operating a switching regulator with an inductance, where one of its terminals is connected to the input of the regulator via a first switch, and to ground via a second switch, and whose other terminal is connected to the output of the regulator via a third switch, and to ground via a fourth switch, whereby all switches can be controlled and where in the procedure in a step-down mode of the switching regulator the third switch is turned on and the fourth switch is turned off, and the first and the second switches are periodically and alternatively switched on and off as a function of the duty cycle determined by the turn-on duration of the first switch, in a step-up mode of the switching regulator the first switch is turned on and the second switch is turned off, and the third and the fourth switches are periodically and alternatively switched on and off as a function of the duty cycle determined by the on-time of the fourth switch, in the step-down mode and in the step-up mode the corresponding duty cycle for the correction of the regulation deviation is modified as a function of the regulation deviation of the output voltage of the regulator, the duty cycle is constantly monitored, when the duty cycle approaches 100% in the step-down mode, the step-up mode is selected, and when the duty cycle approaches 0% in the step-up mode, the step-down mode is selected.

Finally, a further solution according to the invention consists in a method for operating switching regulators with a first inductance where one of its terminals is connected to the input of the regulator and where the other terminal is connected to one end of a first switch, as well as to ground via a second switch, and a second inductance where one of its terminals is connected to the other end of the first switch by means of a third switch, as well as to ground via a fourth switch, and whose other terminal forms the output of the regulator, whereby a capacitor is connected across the connecting point between the first and the third switch and ground, where all switches can be controlled and where in a step-down mode of the switching regulator the first switch is turned on and the second switch is turned off, and the third and the fourth switches are periodically and alternatively switched on and off as a function of the duty cycle determined by the turn-on duration of the third switch, in a step-up mode of the switching regulator the third switch is turned on and the fourth switch is turned off, and the first and the second switches are periodically and alternatively switched on and off as a function of the duty cycle determined by the on-time of the second switch, in the step-down mode and in the step-up mode the corresponding duty cycle for the correction of the regulation deviation is modified as a function of the regulation deviation of the output voltage of the regulator, the duty cycle is constantly monitored, when the duty cycle approaches 100% in the step-down mode, the step-up mode is selected, and when the duty cycle approaches 0% in the step-up mode, the step-down mode is selected.

Figure 4:
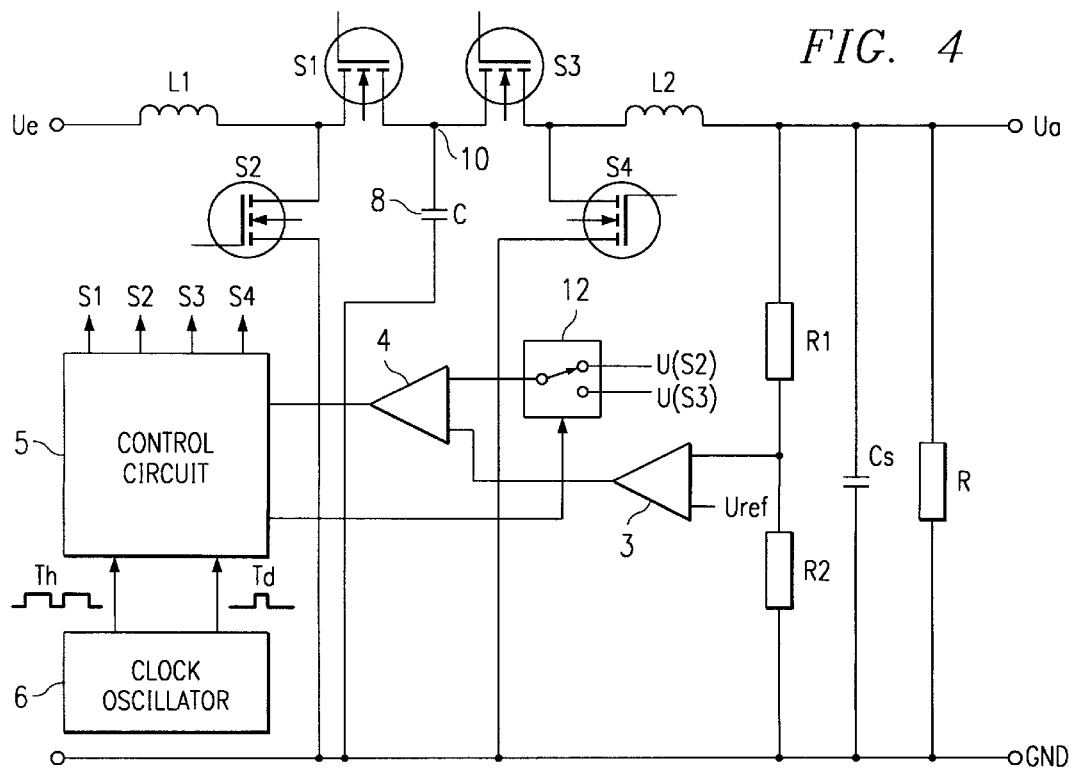
Figure 2A:
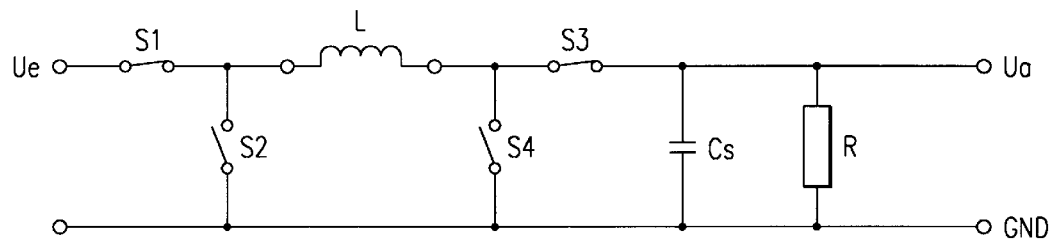

Further characteristics and advantages of the invention result from the following description of an exemplified embodiment when reference to the illustration is made. In the illustrations FIG. 1 shows a circuit diagram of a switching regulator of particularly small design;

FIGS. 2a) to d) represent circuit diagrams showing the different operating modes of the switching regulator represented in FIG. 1;

FIG. 3 is time sequence diagrams to illustrate the function of the clock monitoring element of the switching regulator according to the invention, and FIG. 4 is a circuit diagram of another switching regulator according to the invention which has a reduced current consumption as compared with the switching regulator represented in FIG. 1.

A circuit diagram of a switching regulator according to the invention is represented in FIG. 1. The switching regulator comprises a reactive coil (inductance) L, one of whose terminals 1 is connected via a first switch S1 to the supply input Ue of the switching regulator, and to ground via a second switch S2, and whose other terminal 2 is connected via a third switch S3 to the supply output Ua of the switching regulator, and to ground via a fourth switch S4. All the switches are n-channel enhancement-type MOS FETs, but other types of switch may also be used, as long as these switches can be controlled. Across the output of the switching regulator is a resistor R, symbolising a consumer load, which may be a mobile radio telephone, for example, as well as a storage capacitor Cs, both being connected between Ua and ground.

The remaining components of the circuit represented in FIG. 1 form a control circuit whose purpose it is to regulate the output voltage Ua in such a way that it assumes a constant predetermined value. The regulated voltage comprises a potential divider consisting of the resistors R1 and R2 which applies a voltage which is proportional to the output voltage to one of the inputs of an error voltage amplifier 3, whereby a reference voltage Uref generated by a reference voltage generation circuit (not shown here) is applied to the other input of the error voltage amplifier. The output of the error voltage amplifier 3 is connected to the input of a comparator 4, to whose other input the voltage U(S1) present at the switch S1 is applied. The connection between the switch S1 and the other input of the comparator 4 is not shown here for the sake of clarity. The output of the comparator 4 is connected to a control circuit 5 which comprises a logic unit and a driver stage to drive the gates of the switches S1–S4, which is represented by four arrows. The connections between the control circuit 5 and the individual switches are also not shown for the sake of clarity. Finally, the regulator circuit furthermore includes a clock pulse oscillator 6 which generates and applies to the control circuit a main clock signal Th and a so-called "duty cycle monitoring clock signal" Td which will be explained further on. Preferably, all components of the switching regulator, apart from the inductance L and the capacitor Cs, are combined in an integrated circuit, whereby the regulator can be realised as a unit of very small size, making it eminently suitable for use in small portable devices such as mobile telephones.

FIG. 2 represents in four circuit diagrams a) to d) different operating modes of the switching regulator represented in FIG. 1, which result from different switching positions of the switches S1 to S4. For the sake of clarity, only the switches S1 to S4, the inductance L, the storage capacitor Cs and the load resistor R are represented here.

The switching regulator can be operated in a step-down mode where the input voltage is higher than the output voltage, and can be operated in a step-up mode where the input voltage is lower than the output voltage. Both modes consist each of two different switching phases.

The step-down mode is represented in FIG. 2 under a) and b). When in step-down mode, the switch S3 is always closed and the switch S4 is always open, whilst the switches S1 and S2 are alternatively turned on and off.

Figure 2B:
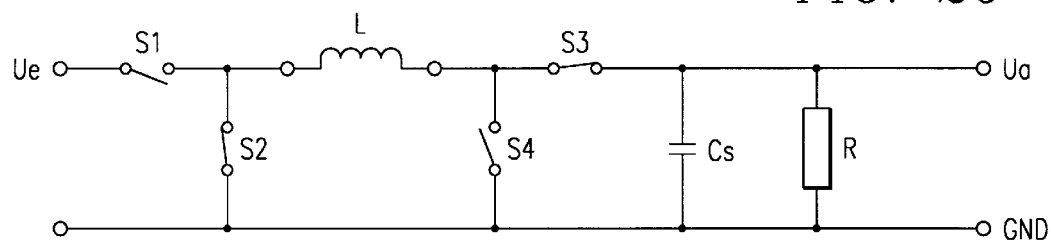

In the initial phase of the step-down mode, which is represented in FIG. 2a), S1 is closed and S2 is open. During this conductive phase ton(S1) a constantly increasing current flows through the switch S1, charging the reactive coil L with magnetic energy, as well as the capacitor Cs with electrical energy, thereby providing energy for the consumer load R. When the switch S1 is opened in the final phase of the step-down mode, which is represented in FIG. 2b), the reactive coil L, by the re-conversion of the stored magnetic energy into electric energy, generates a voltage of reversed polarity. In this phase, current flows through the now-closed switch S2 and feeds the capacitor Cs and the load R1. The output voltage Ua depends in the step-down mode from the energy stored in the reactive coil L and can be adjusted by modifying the on-time ton(S1) in proportion to the cycle duration Δt resulting from the sum of the time duration of both the phases represented.

Using the equation for the duty cycle D $$D = \text{ton}(S1)/\Delta t \tag{1}$$

$$Ua = D \cdot Ue \tag{2}$$

is obtained for the output voltage in the step-down mode.

Figure 2C:
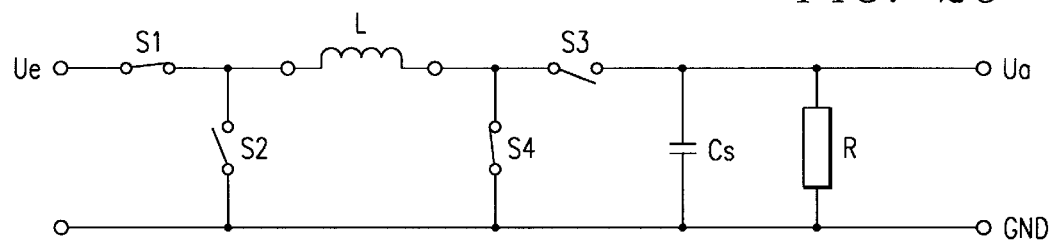

The step-up mode is represented in the FIGS. 2c) and d). In the step-up mode, the switch S1 is constantly closed and the switch S2 is constantly open. The switches S3 and S4 are now alternatively turned on and off.

Figure 2D:
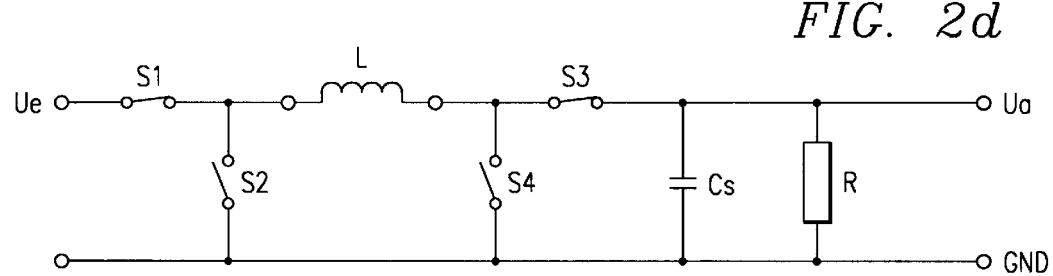

In the initial phase of the step-up mode, which represented in FIG. 2c), S4 is closed and S3 open. A constantly increasing current now flows through the reactive coil L and the switches S1 and S4. During this time, the reactive coil L converts the electrical energy into magnetic energy and stores it. During this phase, the consumer load R is supplied by the storage capacitor Cs. The interruption of the input current in the final phase of the step-up mode, which is represented in FIG. 2d) and in which the switch S4 is open and the switch S3 closed, results in the re-conversion of the stored magnetic energy into an electric current. The reactive coil L now acts as an energy source with reversed potential as compared to the initial phase, and acts together with the input voltage Ue as a series connection of two voltage sources. The output voltage Ua has been increased with respect to the input voltage Ue by the voltage of the reactive coil. The current flows through the switch S3 into the storage capacitor Cs and into the load R. In the step-up mode, the current flowing through the switch S1 reaches its maximum value immediately before the switch-over from the initial phase to the final phase. By modifying the turn-on duration ton(S4) of the switch S4 in proportion to the cycle duration Δt, the value of the output voltage can be set.

Using the equation for the duty cycle D $$D = \text{ton}(S4)/\Delta t \tag{3}$$

$$Ua = Ue/(1-D) \tag{4}$$

is obtained for the output voltage in the step-up mode.

When considering the equations (2) and (4), it can be seen that whenever the duty cycle D approaches 100% in the step-down mode, and when the duty cycle D approaches 0% in the step-up mode, the value of the output voltage Ua tends to approach the value of the input voltage Ue. Recognition of the tendency for the duty cycle D to approach one of the two limiting values can therefore be used to determine the point in time of the switch-over between the two modes of the switching regulator, which shall be explained in more detail further on.

The method of operation of the switching regulator according to the invention represented in FIG. 1 shall now be explained with reference to the FIG. 3 (in conjunction with FIG. 1). A method for operating a switching regulator will be described at the same time.

Figure 3A:
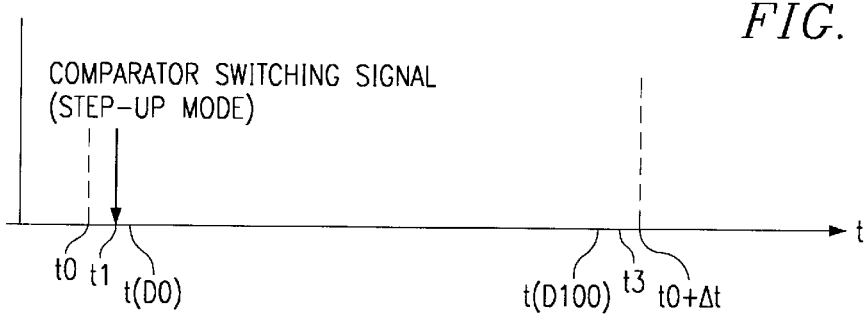
Figure 3B:
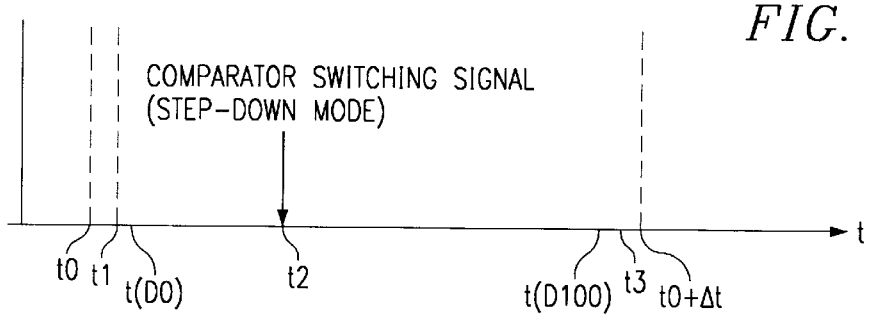
Figure 3C:
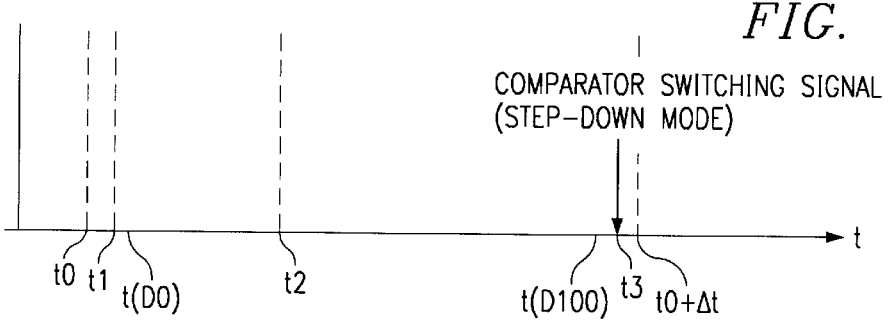
Figure 3D:
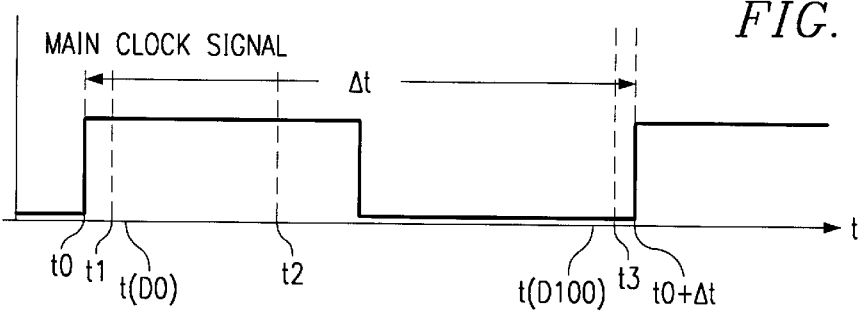

The beginning of the initial phase in either step-down or step-up mode is initiated in each case by the rising edge of the main clock signal Th generated by the clock oscillator 6 and represented in FIG. 3d) by the control circuit 5 (point of time t0), which then proceeds to set the corresponding switch position of the switches S1–S4. The cycle duration Δt of the main clock signal thus determines the duration of the switching cycle resulting from the sum of the initial phase and the final phase of the step-down mode and of the step-up mode. In the case of switching regulators for mobile radio telephones, the switching frequency may be for example 500 kHz, so that a cycle duration of 2 Ts is obtained.

During the operation of the switching regulator, the error voltage amplifier 3 amplifies the voltage difference between a voltage proportional to the output voltage Ua and the reference voltage Uref and passes on the amplified voltage difference value ΔV as a threshold value to an input of the comparator 4.

The comparator 4 outputs a switching signal when the voltage U(S1), monitored by it at its other input and present at switch S1, exceeds the threshold value. On reception of the switching signal provided by the comparator, the control circuit switches the switches S1–S4 into the switching position corresponding to the final phase of the step-down or step-up cycle, respectively. In this way, the comparator 4 determines in the step-down mode the on-time ton(S1) of the first switch, and in the step-up mode the on-time ton(S4) of the fourth switch, and therefore the duty cycle D in both modes. Deviations of the actual output voltage Ua from the nominal value determined by the reference voltage Uref can therefore be corrected by the modification of the duty cycle D by the comparator 4 in conformity with the above equations (2) and (4). The comparator therefore functions as a pulse duration modulator.

The final phase in the step-down mode or step-up mode, respectively, is terminated when the control circuit 5 at the following ascending edge of the main clock signal Th at the point in time t0+Δt once again takes the switches into the position corresponding to the initial phase represented in FIGS. 2 a) and c).

Switch-over between step-down mode and step-up mode is achieved by means of a duty cycle monitoring element which is integrated in the control circuit and which constantly monitors the duty cycle D. It is by monitoring the duty cycle D that it becomes possible to determine whether the switching regulator in its step-down or step-up mode is approaching one of its limits, where a switch-over into the other mode becomes necessary. If the duty cycle D approaches 0% in its step-up mode, a further voltage reduction in the step-up mode is not possible, in conformity with equation (4), and for the purpose of further voltage reduction a switch-over into the step-down mode becomes necessary. The reverse is true when the duty cycle D in step-down mode approaches 100% and a further voltage increase becomes impossible in accordance with equation (2), and switch-over into the step-up mode becomes necessary.

Figure 3E:
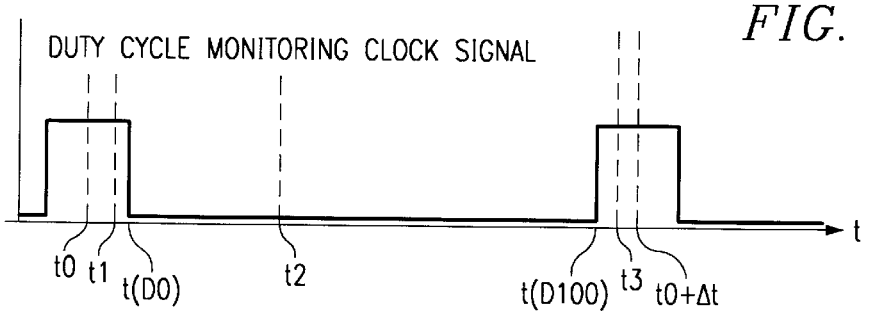

The duty cycle monitoring element makes use of a duty cycle monitoring signal Td, not represented in FIG. 3e) and supplied by the clock oscillator 6, in order to monitor the duty cycle D. The duty cycle monitoring signal Td has in this case the same frequency as the main clock signal. Its pulse duration, however, is relatively short when compared with the cycle duration Δt and may, as an example, amount to only 10% of the cycle duration Δt . Furthermore, the pulse of the duty cycle monitoring signal Td preceeds the pulse of the main clock signal Th by half the pulse duration of the duty cycle monitoring signal Td. A comparison element 50 which may be realised by a logic circuit and an AND gate, is integrated into the control circuit 5, and this receives the output signal of the comparator 4 and the duty cycle monitoring clock signal Td.

If the comparator switching signal occurs for example, as represented in FIG. 3a), in the step-up mode at the point in time t1, that is before the point in time t(D0) defined by the first descending edge occurring after the start of the cycle of the duty cycle monitoring clock signal represented in FIG. 3e), the comparison element outputs a signal to the control circuit 5 which then effects the switch-over from step-up mode to step-down mode by a corresponding change of the switching positions of the switches S1–S4. This is because the duty cycle D, as defined by the distance of the comparator switching signal from the point in time t0 of the first ascending edge of the main clock signal Th, is then approaching 0%. If the pulse duration of the duty cycle monitoring clock signal Th in FIG. 3e) is, as represented above as an example, only 10% of the cycle duration Δt , then, if D in the step-up mode is between 0 and 5%, switch-over into the step-down mode takes place.

If the comparator switching signal occurs for example, as represented in FIG. 3c), in the step-down mode at the point in time t3, that is after the point in time t(D100) defined by the first ascending edge occurring after the start of the cycle of the duty cycle monitoring clock signal, the comparison element outputs a signal to the control circuit 5 which then effects the switch-over from step-down mode to step-up mode by a corresponding change of the switching positions of the switches S1–S4. This is because the duty cycle D, as defined by the distance of the comparator switching signal from the point in time t0 of the first ascending edge of the main clock signal Th, is then approaching 100%. With a pulse duration of the duty cycle monitoring clock signal Th as assumed above, switch-over from step-down mode to step-up mode takes place when D in the step-down mode is between 95 and 100%.

If the comparator switch signal, as represented in FIG. 3b), occurs for example in the step-down mode at the point in time t2, which is between the points in time t(D0) and t(D100), no switching signal is generated by the comparison element and the same mode is retained.

It is, of course, also possible to use an inverse signal to the one represented in FIG. 3e) as duty cycle monitoring clock signal, where the no-pulse period is short in relation to the cycle duration Δt . In such a case, the comparison element supplies a switching signal to the control circuit when the comparator in its step-up mode outputs the switching signal before the first descending edge of the duty cycle monitoring clock signal occurring after the start of the cycle, or when the comparator in its step-down mode supplies the switching signal after the first ascending edge of the duty cycle monitoring clock signal occurring after the start of the cycle. Preferably, the pulse duration (or the no-pulse period, respectively) of the duty cycle monitoring clock signal Td is to be 5 to 10% of the cycle duration Δt of the main clock signal Th.

If the switches S1 to S4 are integrated switches (such as MOS FETS), a safety mechanism for the protection of the switches has to be provided which prevents the switch-over between step-up and step-down modes as long as the amount of the difference between the input voltage Ue and the output voltage Ua exceeds a specific safety limiting value. To this end, a window comparator 52 may for example be provided, which monitors the difference between the input and the output voltage of the regulator and on exceeding the safety limiting value supplies a signal which disables the switch-over between step-up and step-down modes until the value falls below the safety limiting value.

As opposed to a step-down/step-up switching regulator as described in the introduction, where the step-down and step-up modes do not take place separately from each other and where four switches are switched for each switching period, a clear reduction in current consumption results from the switching regulator represented according to the invention, since this only involves the actuation of two switches per switching cycle, which leads to a marked reduction in switching losses.

In addition to this, further savings in current consumption result from the fact that the current flowing through the reactive coil L in the case of the switching regulator according to the invention with separate step-down and step-up modes as compared with regulators operating in only one combined step-down/step-up mode is always lower. This results from the following table in which the current $I_L$ flowing through the reactive coil L is compared for the arrangements where the step-down and step-up modes are separated and where the step-down/step-up modes are combined, where $I_R$ is the current flowing through the load R:

| Step-down mode | Step-up mode | Step-down/step-up mode |
|---|---|---|
| $I_R$ | $I_{R/(1-D)} =$ $I_R \cdot (Ua/Ue)$ | $I_{R/(1-D)} =$ $I_R \cdot (Ue + Ua)/Ue$ |

In the step-down mode, the reactive coil current $I_L$ always flows through the load R. In the step-up mode and in the step-down/step-up mode, the reactive coil current $I_L$ only flows through the load R during the final phase of a switching cycle, that is during the time period $(1-D)$, $\Delta t$. The reactive coil current $I_L$ is therefore always greater than the load current $I_R$.

If Ua<Ue obtains, the step-down/step-up mode is comparable with the step-down mode. Since (Ue+Ua)/Ue>1 obtains, $I_L$ is smaller in the step-down mode than in the step-down/step-up mode.

If Ua>Ue obtains, the step-down/step-up mode is comparable with the step-up mode. Since (Ue+Ua)/Ue>Ua/Ue obtains, $I_L$ is smaller in the step-up mode than in the step-down/step-up mode.

In the event that Ua=Ue obtains, it can be seen that $I_L=I_R$ for the step-down mode and for the step-up mode, whilst $I_L=2 \cdot I_R$ obtains in the step-down/step-up mode.

It therefore follows that the reactive coil current $I_L$ in the combined step-down/step-up mode is always greater than when separating the step-down mode from the step-up mode according to the invention. This, of course, also results in a lower current flow through the switches, and so in reduced losses. The overall result is therefore a markedly improved efficiency of the switching regulator according to the invention and represented in FIG. 1, as compared with previous solutions.

The reduced reactive coil current $I_L$ can also be used to advantage in that a smaller dimensioned coil as well as smaller switches as compared with step-down/step-up regulators can be used, which leads to a saving a chip space.

The switching regulator represented in FIG. 1, whereby apart from the inductance L and the capacitor Cs preferably all components are realised in the form of one single integrated circuit, is particularly suited for applications in small portable devices such as mobile radio telephones. Here, the value of the inductance L would be in the range of around 10 TH, which cannot be realised within an integrated circuit.

A further switching regulator according to the invention is represented in FIG. 4. This switching regulator is similar to the one represented in FIG. 1, and the same reference signs refer to the same elements.

The switching regulator represented in FIG. 4 has a first reactive coil (inductance) L1, one of its terminals being connected to the input of the regulator (Ue), and the other terminal to one end of a first switch S1 as well as to ground via a second switch S2, and a second reactive coil (inductance) L2 whose one terminal is connected to the other end of the first switch S1 via a third switch S3, as well as to ground via a fourth switch S4, and whose other terminal leads to the output of the regulator (Ua), whereby a capacitor C with reference number 8 is connected to a junction point between the first switch S1 and the third switch S3 and to ground. All switches here are also controllable and consist preferably of MOS FETs of the n-channel enhancement type. The inductivity of the reactive coil L1 is equal to that of L2.

The switching regulator represented in FIG. 4 operates in a similar way as the switching regulator represented in FIG. 1 and can also be operated in separate step-down and step-up modes. Thereby the coil L1 assumes the function of the coil L of the switching regulator represented in FIG. 1 in step-up mode, whilst the coil L2 assumes the function of coil L of the switching regulator represented in FIG. 1 when in step-down mode. The capacitor C is required to ensure that a low impedance obtains at the junction point 10 at the relevant switching frequency, in order to avoid damage to the S1–S4 MOS FETs and to ensure the correct operation of the comparator 4.

In the step-down mode of the switching regulator represented in FIG. 4, the first switch S1 is always turned on and the second switch S2 is always turned off. The third switch S3 and the fourth switch S4 are thereby periodically and alternatively switched on and off at a duty cycle D determined by the on-time of the third switch S3. In the step-up mode, the third switch S3 is constantly turned on and the fourth switch S4 is constantly turned off. Hereby the first switch S1 and the second switch S2 are periodically and alternatively switched on and off at a duty cycle determined by the on-time of the second switch S2.

The control circuit functions here in principle like the switching regulator represented in FIG. 1. Once again, the control circuit controls the switches S1–S4 and contains a pulse duration modulator which modifies the relevant duty cycle D for the correction of the regulation deviation as a function of the regulation deviation of the nominal output voltage of the regulator. Here, too, the control circuit furthermore comprises a duty cycle monitoring element which, as with the procedure according to which the switching regulator represented in FIG. 1 operates, monitors the duty cycle and switches into the step-up mode when the duty cycle approaches 100% in the step-down mode, and into the step-down mode when the duty cycle approaches 0% in the step-up mode.

Here, too, the control circuit comprises a clock oscillator 6 whose main clock signal Th in the step-down and step-up modes defines the cycle duration $\Delta t$ which is composed of the turn-on and the turn-off duration of the third switch S3 (in the step-down mode) or of the second switch S2 (in the step-up mode) respectively, and whose ascending edge determines the start of a switching cycle, where in the step-down mode the third switch S3 is turned on and the fourth switch S4 is turned off and in the step-up mode the second switch S2 is turned on and the first switch S1 is turned off.

Also in the case of the switching regulator represented in FIG. 4, the phase modulator consists of a comparator 4 which at one input in the step-down mode receives the voltage present at the second switch S2 and in the step-up mode the voltage present at the third switch S3, and at another input the amplified control deviation supplied by an error voltage amplifier 3, whereby the comparator, when the voltage present at the second switch S2 (in the step-down mode) or at the third switch S3 (in the step-up mode), respectively, has reached a value which is sufficient for the compensation of the regulation deviation, outputs a switching signal to the control circuit, thereby causing the third switch S3 to turn off and the fourth switch S4 to turn on in the step-down mode, and the second switch S2 to turn off and the first switch S1 to turn on in the step-up mode.

In contrast to the switching regulator represented in FIG. 1, the switching regulator represented in FIG. 4 has a switch 12 which is controlled by the switching signal produced by the duty cycle monitoring element in such a way that when the duty cycle monitoring element switches over into the step-down mode, the one input of the comparator 4 is connected to the voltage U(S2) present at the switch S2, and when the duty cycle monitoring element switches over into the step-up mode, the one input of the comparator 4 is connected to the voltage U(S3) present at the third switch S3. As opposed to the comparator 4 as represented in FIG. 1, it is not possible here to derive the current determining the duty cycle D from just one of the switches S1–S4, because of the interfering effect of the second reactive coil. As an alternative to the switch 12 it is, of course, possible to use two separate comparators in place of the comparator 4.

Although, on account of the additional external circuit components (second coil, capacitor C) which are not suitable for integration, the switching regulator represented in FIG. 4 is larger in size than the switching regulator represented in FIG. 1, it offers additional advantages as regards current consumption and has a higher efficiency than the switching regulator represented in FIG. 1.

When, for example, considering the step-up mode, then, on the assumption of negligible losses, the load current $I_R$ has to be multiplied by Ua/Ue in order to obtain the reactive coil current $I_L$.

In the switching regulator represented in FIG. 1 there is a greater or lesser voltage drop of $I_L$, Rdson at the input, whereby Rdson represents the switch-on resistance of the switch S1. This leads to a reduction of the effective input voltage Ue, which automatically results in a higher value of the reactive coil current $I_L$. This means, however, that the switches S3 and S4 must also pass this increased current $I_L$.

When now considering the circuit diagram represented in FIG. 4, it can be seen that there is no transistor switch at the input of the switching regulator, so that the effective value of the input voltage Ue is not reduced in this case. Although even here there is a transistor switch S3 connected in series to the output of the switching regulator, this only has to pass the current $I_R$, the value of which is less than that of the reactive coil current $I_L$.

These considerations can easily be applied to the step-down mode, where corresponding savings are obtained.

This means that the switching regulator represented in FIG. 4, as opposed to the switching regulator represented in FIG. 1, boasts a reduced current consumption and therefore a greater efficiency. The savings with input voltages, to give an example, in mobile telephone applications which may for example be in the range of 2.7 to 3 volts can be considerable. These advantages result in increased battery life with identical switch dimensions. They may, however, also be used to advantage in making the transistors smaller in comparison with the switching regulator represented in FIG. 1, which again saves chip size.

What is claimed is:

1. Switching regulator comprising:
    an inductance of which one terminal is connected to the input of the regulator by a first switch and to ground by a second switch, and whose other terminal is connected to the output of the regulator by a third switch, and to ground by a fourth switch, whereby all switches are capable of being controlled and where the regulator can be operated in step-down mode, where the third switch is constantly turned on and the fourth switch is constantly turned off, and the first and the second switches are periodically and alternatively switched on and off, as a function of the duty cycle determined by the on-time of the first switch, and in step-up mode in which the first switch is constantly on and the second switch is constantly off, and where the third and the fourth switch are periodically and alternatively switched on and off as a function of the duty cycle determined by the on-time of the fourth switch,
    a control circuit for the control of the switches,
    a pulse duration modulator for the modification of the corresponding duty cycle for the correction of the regulation deviation as a function of the regulation deviation of the output voltage of the regulator, and
    an element for monitoring the duty cycle and, when a duty cycle of 100% is approached in the step-down mode, switches to the step-up mode and when a duty cycle of 0% is approached in the step-up mode, switches to the step-down mode.

2. Switching regulator according to claim 1, wherein the control circuit comprises a clock oscillator providing a main clock signal which in the step-down and step-up modes determines the cycle duration which is composed of the turn-on and the turn-off duration of the first switch in or of the fourth switch, respectively in, and having an ascending edge which determines the start of a switching cycle, the first switch being turned on in the step-down mode and the second switch being is turned off, and the fourth switch being turned on in the step-up mode and the third switch being turned off.

3. Switching regulator according to claim 1 wherein with the exception of the inductance, all components of the regulator are integrated on one IC.

4. Switching regulator comprising:
    an inductance of which one terminal is connected to the input of the regulator by a first switch and to ground by a second switch, and whose other terminal is connected to the output of the regulator by a third switch, and to ground by a fourth switch, whereby all switches are capable of being controlled and where the regulator can be operated in step-down mode, where the third switch is constantly turned on and the fourth switch is constantly turned off and the first and the second switches are periodically and alternatively switched on and off, as a function of the duty cycle determined by the on-time of the first switch, and in step-up mode in which the first switch is constantly on and the second switch is constantly off, and where the third and the fourth switch are periodically and alternatively switched on and off as a function of the duty cycle determined by the on-time of the fourth switch,
    a control circuit for the control of the switches,
    a pulse duration modulator for the modification of the corresponding duty cycle for the correction of the regulation deviation as a function of the regulation deviation of the output voltage of the regulator, and
    an element for monitoring the duty cycle and, when a duty cycle of 100% is approached in the step-down mode, switches to the step-up mode and when a duty cycle of 0% is approached in the step-up mode, switches to the step-down mode;
    wherein the control circuit comprises a clock oscillator providing a main clock signal which in the step-down and step-up modes determines the cycle duration which is composed of the turn-on and the turn-off duration of the first switch in step-down mode or of the fourth switch, respectively in step-up mode, and having an ascending edge which determines the start of a switching cycle, the first switch being turned on in the step-down mode and the second switch being is turned off, and the fourth switch being turned on in the step-up mode and the third switch being turned off;

and wherein the phase modulator comprises a comparator which receives at one input the voltage present at the first switch, and at the other input the amplified regulation deviation provided by an error voltage amplifier, whereby the comparator at the point in time when the voltage present at the first switch has reached a value which is sufficient for the compensation of the regulation deviation, outputs a switching signal to the control circuit switching the first switch off and the second switch on in the step-down mode, and switching the fourth switch off and the third switch on in the step-up mode.

5. Switching regulator according to claim 4, wherein the duty cycle monitoring element is realised in the form of a comparator element which constantly compares a duty cycle monitoring signal, generated by the clock oscillator and having a frequency of the main clock signal, having a pulse duration which is short compared with the cycle duration and which lags behind the main clock signal by half of its pulse duration, with the switching signal of the comparator, whereby the comparator element at the point in time when the comparator in the step-up mode of the switching regulator delivers the switching signal before the first ascending edge of the duty cycle monitoring signal occurring after the first ascending edge of the main clock signal, outputs a signal to the control circuit causing this to switch into the step-down mode, and when the comparator in the step-down mode of the switching regulator delivers the switching signal after the first falling edge of the duty cycle monitoring clock signal occurring after the first ascending edge of the main clock signal, is prompted by it to switch over into the step-up mode.

6. Switching regulator according to claim 5, wherein the no-pulse period of the duty cycle monitoring clock signal represents 5 to 10% of the cycle duration of the main clock signal.

7. Switching regulator according to claim 5 further comprising a mobile radio telephone, wherein said switching regulator converts the voltage supplied by a battery into a constant supply voltage.

8. Switching regulator according to claim 4 wherein the error voltage amplifier is a differential amplifier receiving at one input a signal proportional to the output voltage of the switching regulator, and at the other input receiving a reference voltage which sets the nominal output voltage of the switching regulator.

9. Switching regulator according to claim 4 wherein the duty cycle monitoring element is a comparator element which constantly compares a duty cycle monitoring signal, generated by the clock oscillator and having the frequency of the main clock signal, having a pulse duration which is short compared to the cycle duration and which precedes the main clock signal by half of its pulse duration, with the switching signal of the comparator, whereby the comparator element at the point in time when the comparator in the step-up mode of the switching regulator delivers the switching signal before the first falling edge of the duty cycle monitoring signal occurring after the first ascending edge of the main clock signal, outputs a signal to the control circuit causing this to switch into the step-down mode, and when the comparator in the step-down mode of the switching regulator delivers the switching signal after the first ascending edge of the duty cycle monitoring clock signal occurring after the first ascending edge of the main clock signal, is prompted by it to switch over into the step-up mode.

10. Switching regulator according to claim 9, wherein the pulse duration of the duty cycle monitoring clock signal represents 5 to 10% of the cycle duration of the main clock signal.

11. Method for operating switching regulators with a first inductance wherein one of its connections is connected to the input of the regulator and where other connection is connected to one end of a first switch, as well as to ground via a second switch, and a second inductance wherein one of its connections is connected to the other end of the first switch by means of a third switch, as well as to ground via a fourth switch, and having another connection which forms the output of the regulator, a capacitor being connected across the connecting point between the first and the third switch and ground, all switches being controlled and where in a step-down mode of the switching regulator the first switch is turned on and the second switch is turned off, and the third and the fourth switches are periodically and alternatively switched on and off as a function of the duty cycle determined by the turn-on duration of the third switch, in a step-up mode of the switching regulator the third switch is turned on and the fourth switch is turned off, and the first and the second switches are periodically and alternatively switched on and off as a function of the duty cycle determined by the turn-on time of the second switch, in the step-down mode and in the step-up mode the corresponding duty cycle for the correction of the regulation of the output voltage of the regulator, the duty cycle being constantly monitored, when the duty cycle approaches 100% in the step-down mode, the step-up mode is selected, and when the duty cycle approaches 0% in the step-up mode, the step-down mode is selected.

12. Switching regulator comprising:

a first inductance where one of its connections is connected to the input of the regulator and where the other connection is connected to one end of a first switch, as well as to ground by a second switch, and a second inductance where one of its connections is connected to the other end of the first switch by means of a third switch, as well as to ground via a fourth switch, and whose other connection forms the output of the regulator, whereby a capacitor is connected across the connecting point between the first and the third switch and ground, where all switches can be controlled when the regulator is operated in a step-down mode, where the first switch is constantly turned on and the second switch is constantly turned off, and the third and the fourth switches are periodically and alternatively switched on and off, as a function of the duty cycle determined by the turn-on time time of the third switch, and when in step-up mode the third switch is constantly on and the fourth switch is constantly off, and where the first and the second switches are periodically and alternatively switched on and off as a function of the duty cycle determined by the turn-on time of the second switch, a control circuit for the control of the switches, a pulse duration modulator for the modification of the corresponding duty cycle for the correction of the regulation deviation as a function of the regulation deviation of the output voltage of the regulator, and an element for monitoring the duty cycle and, when a duty cycle of 100% is approached in the step-down mode, switches to the step-up mode and when a duty cycle of 0% is approached in the step-up mode, switches to the step-down mode.

13. Switching regulator according to claim 12 wherein with the exception of the two inductors and the capacitor, all components of the regulator are integrated on one IC.

14. Switching regulator according to claim 12 wherein the controllable switches are integrated switches which are n-channel enhancement-type MOSFETs and wherein the control circuit comprises a gate drive circuit to drive the MOSFETs.

15. Switching regulator according to claim 14 wherein the switch-over mechanism between step-up and step-down mode is activated only when the amount of the difference between the input voltage and the output voltage of the regulator does not exceed a specific limiting safety value.

16. Switching regulator according to claim 15 wherein a window comparator monitors whether the amount of the difference between the input voltage and the output voltage of the regulator does not exceed the limiting safety value and provides a signal when the limiting safety value is exceeded which causes the deactivation of the switch-over mechanism between the step-up and the step-down modes.

17. Switching regulator according to claim 12, wherein the control circuit comprises a clock oscillator providing a main clock signal which in the step-down and step-up modes determines the cycle duration and is composed of the turn-on and the turnoff duration of the third switch in or of the second switch, respectively in step-up mode, and having an ascending edge which determines the start of a switching cycle, and in the step-down mode the third switch is turned on and the fourth switch is turned off, and in the step-up mode the second switch is turned on and the first switch is turned off.

18. Switching regulator according to claim 17, wherein the phase modulator consists of a comparator which, in the step-down mode, receives at one input the voltage present at the second switch and in the step-up mode the voltage present at the third switch, and at the other input the amplified regulation deviation provided by an error voltage amplifier, whereby the comparator at the point in time when the voltage present at the second switch in the step-down mode or at the third switch in the step-up mode respectively, has reached a value which is sufficient for the compensation of the regulation deviation, outputs a switching signal to the control circuit, for in the step-down mode, switching the third switch off and the fourth switch on, and in the step-up mode switching the second switch off and the first switch on.

19. Switching regulator according to claim 18, wherein a switch is provided which is controlled by the switching signal generated by the duty cycle monitoring element so that when the duty cycle monitoring element switches into the step-down mode, one input of the comparator is connected to the voltage present at the second switch and, when the duty cycle monitoring element switches into the step-up mode, one input of the comparator is connected to the voltage present at the third switch.

20. Method for operating a switching regulator with an inductance, wherein one of its connections is connected to the input of the regulator via a first switch, and to ground via a second switch, and having another connection which is connected to an output of the regulator via a third switch, and to ground via a fourth switch, whereby all switches being controlled and wherein in a step-down mode of the switching regulator the third switch is turned on and the fourth switch is turned off, and the first and the second switches are periodically and alternatively switched on and off as a function of the duty cycle determined by the turn-on duration of the first switch, and in a step-up mode of the switching regulator the first switch is turned on and the second switch is turned off, and the third and the fourth switches are periodically and alternatively switched on and off as a function of the duty cycle determined by the turn-on time of the fourth switch, in the step-down mode and in the step-up mode the corresponding duty cycle for the correction of the regulation deviation is modified as a function of the regulation deviation of the output voltage of the regulator, the duty cycle being constantly monitored, when the duty cycle approaches 100% in the step-down mode, the step-up mode is selected, and when the duty cycle approaches 0% in the step-up mode, the step-down mode is selected.

* * * * *